United States Patent [19]
Dunne

[11] Patent Number: 5,780,999
[45] Date of Patent: Jul. 14, 1998

[54] VOLTAGE CONVERSION CIRCUIT FOR A LASER BASED DISTANCE MEASUREMENT AND RANGING INSTRUMENT

[75] Inventor: Jeremy G. Dunne, Littleton, Colo.

[73] Assignee: Laser Technology, Inc., Englewood, Colo.

[21] Appl. No.: 702,366

[22] Filed: Aug. 23, 1996

[51] Int. Cl.⁶ ............................................. G05F 1/10
[52] U.S. Cl. .................. 323/222; 323/283; 323/284; 323/288
[58] Field of Search ...................... 323/222, 224, 323/225, 284, 285, 288, 283

[56] References Cited

U.S. PATENT DOCUMENTS

| | | | |
|---|---|---|---|
| 4,709,321 | 11/1987 | Trantham | 363/56 |
| 5,349,284 | 9/1994 | Whittle | 323/285 |
| 5,418,702 | 5/1995 | Marinus et al. | 363/16 |

*Primary Examiner*—Peter S. Wong
*Assistant Examiner*—Shawn Riley

*Attorney, Agent, or Firm*—William J. Kubida; John R. Wahl; Holland & Hart LLP

[57] ABSTRACT

A voltage conversion circuit for transforming an input voltage level at an input voltage node to a relatively higher output voltage level at an output voltage node with respect to a common reference voltage node includes an inductor coupling the input voltage node to the output voltage node and a signal source, such as a linear timer integrated circuit ("IC") supplying an output signal having alternating first and second states thereof. A bipolar switch having first and second current carrying terminals and a control terminal thereof has its first current carrying terminal coupled to the output voltage node and its control terminal coupled to receive the output signal from the signal source. An MOS switch having first and second voltage carrying terminals and a gate terminal thereof, has its first voltage carrying terminal coupled to the common reference voltage node, its second voltage carrying terminal coupled to the second current carrying terminal of the bipolar switch and its gate terminal coupled to receive the output signal from the signal source. At least one diode couples the control terminal of the bipolar switch to the reference voltage node.

48 Claims, 2 Drawing Sheets

VOLTAGE CONVERSION CIRCUIT FOR A LASER BASED DISTANCE MEASUREMENT AND RANGING INSTRUMENT

CROSS REFERENCE TO RELATED APPLICATIONS

The present invention is related to that disclosed and claimed in U.S. patent application Ser. No.: 08/702365, file Aug. 23, 1996 for: "Pre-Biasing Technique for a Transistor Based Avalanche Circuit in a Laser Based Distance Measurement and Ranging Instrument" filed concurrently herewith and assigned to the assignee of the present invention, Laser Technology, Inc., Englewood, Colo., the disclosure of which is hereby specifically incorporated by this reference.

BACKGROUND OF THE INVENTION

The present invention relates, in general, to the field of voltage conversion circuits for battery powered portable electronic devices. More particularly, the present invention relates to a high efficiency voltage conversion circuit which utilizes low cost components and is extremely energy efficient and is of particular utility in the implementation of a small form factor, battery powered laser based range finder.

Laser based distance and range measuring equipment have been used for a number of years to provide extremely accurate distance measurements to a remote target or object. A representative instrument is the Criterion™ 100 laser range finder developed and marketed by Laser Technology, Inc., assignee of the present invention. Although a highly accurate and reliable device, its great distance ranging capability and inherent complexity translates to a manufacturing cost and form factor most suitable only for certain specific applications. A need therefore exists for a laser based range finder which can be economically manufactured as a light weight, rugged and compact unit to nevertheless provide extremely accurate distance measurement capabilities across a wide range of potential applications. To this end, it is therefore highly desirable to provide a high efficiency voltage conversion circuit that would allow for use of a relatively light weight battery power source while concomitantly providing reliable operation, relatively low component count, and low cost.

SUMMARY OF THE INVENTION

The present invention advantageously provides a high efficiency voltage conversion circuit of particular utility in conjunction with portable, battery powered circuits requiring a high voltage bias at relatively low current levels with very high efficiency and low drain on the battery. Functionally, the combination of a bipolar transistor and series connected MOSFET transistor as herein disclosed operate as a "hybrid" (i.e. bipolar/MOS) transistor exhibiting extremely low collector capacitance, with very high base drive efficiency, extremely fast switch-off times at low cost and with very little power lost to the capacitance of the node. The high voltage conversion circuit of the present invention provides approximately twice the efficiency (on the order of 70%) of any other available low cost voltage conversion circuit available for use in conjunction with portable, battery powered high voltage circuitry (such as those used in portable battery powered laser distance measurement and ranging devices) and is easily capable of converting a 5 volt input voltage to an output voltage of on the order of 150 to 350 volts. The high voltage conversion circuit of the present invention may be advantageously provided using extremely low cost components and is extremely energy efficient.

Particularly disclosed herein is a voltage conversion circuit for transforming an input voltage level at an input voltage node to a relatively higher output voltage level at an output voltage node with respect to a common reference voltage node. The voltage conversion circuit comprises an inductor coupling the input voltage node to the output voltage node and a signal source supplying an output signal having alternating first and second states thereof. A bipolar switch having first and second current carrying terminals and a control terminal thereof has its first current carrying terminal coupled to the output voltage node and its control terminal coupled to receive the output signal from the signal source. A MOS switch having first and second voltage carrying terminals and a gate terminal thereof, has its first voltage carrying terminal coupled to the common reference voltage node, its second voltage carrying terminal coupled to the second current carrying terminal of the bipolar switch and its gate terminal coupled to receive the output signal from the signal source. At least one diode couples the control terminal of the bipolar switch to the reference voltage node.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
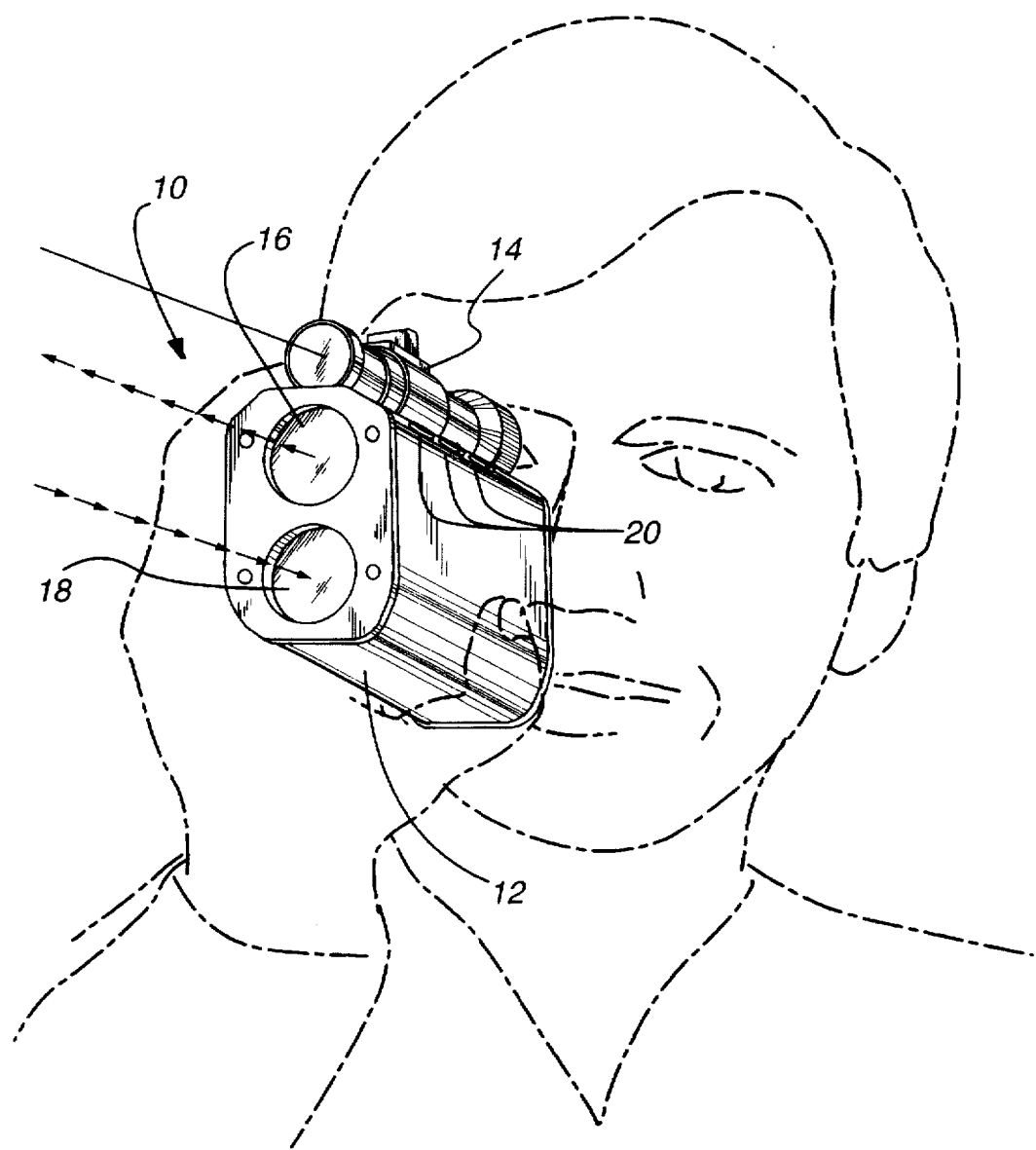
FIG. 1 is a perspective view of a representative laser based distance measurement and ranging instrument in accordance with a particular application of the high efficiency voltage conversion circuit of the present invention.

With reference now to FIG. 1, a laser based distance measurement and ranging instrument 10 is shown representing a possible application of a high efficiency voltage conversion circuit in accordance with the present invention as will be more fully described hereinafter. The instrument 10 includes, in pertinent part, a housing 12 which is capable of being held in one hand of a user substantially as illustrated. The housing 12 encloses the electronic and optical components of the instrument 10 inclusive of the battery based power source.

An instrument sight 14 (which may include a sighting reticle with a head-up display including alphanumeric or graphic representations of distances to a remote object) may be affixed to an upper portion of the housing 12 to enable a user to aim the instrument 10 towards a desired target. A signal transmitting aperture 16 and adjacent reflected signal receiving aperture 18 respectively allow for the transmission and reception of signals to enable the instrument 10 to accurately determine distances to a target from which the transmitted signal is reflected back to the instrument 10 by calculation of the signal time-of-flight. A plurality of selection switches 20, (which, in the embodiment shown, may be duplicated at two locations on the housing 12 so as to be readily accessible in either right-handed or left-handed modes of operation) allow a user to select particular features or operating modes of the instrument 10.

Figure 2:
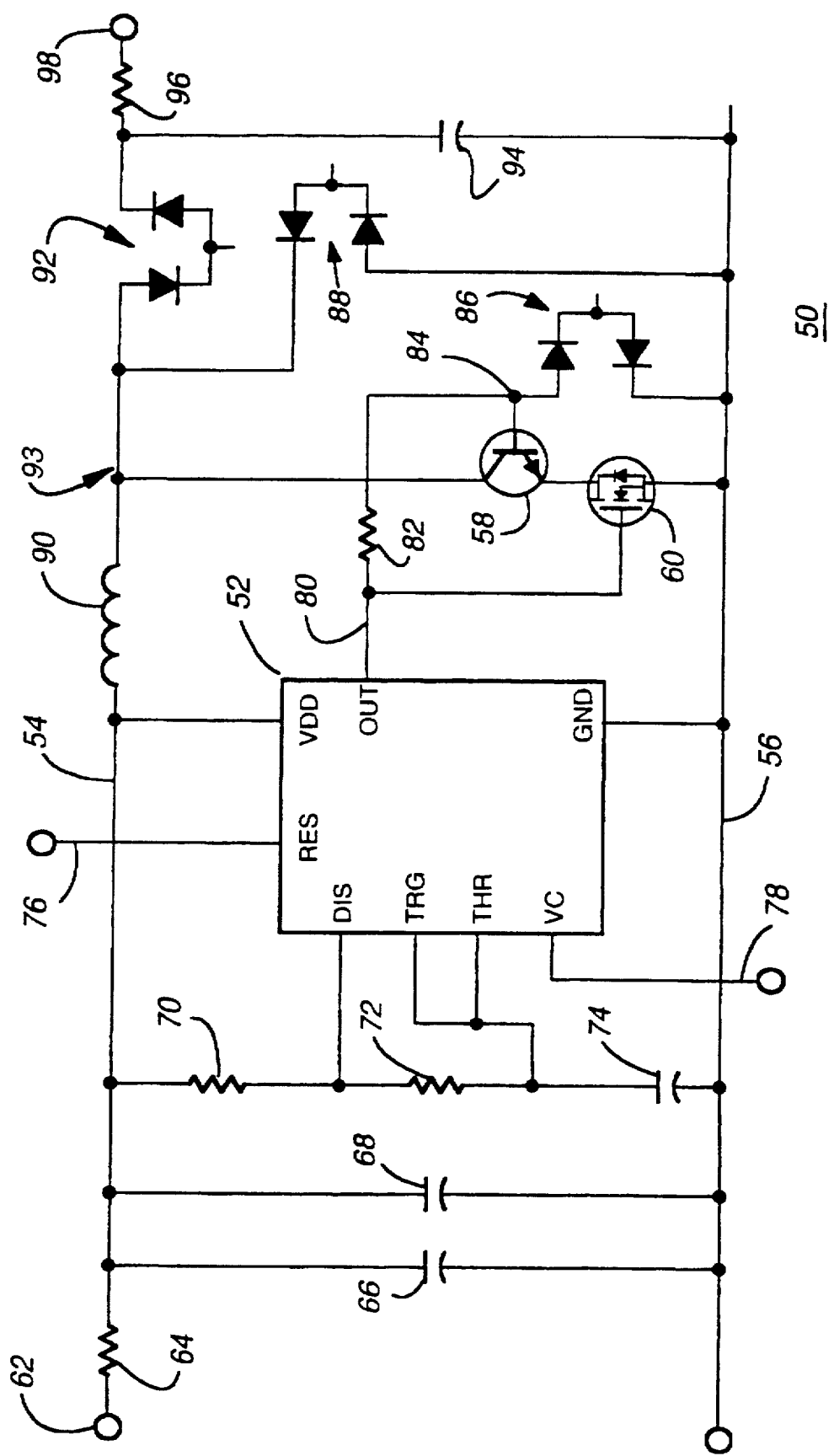
FIG. 2 is a detailed schematic illustration of a particular embodiment of a high efficiency voltage conversion circuit in accordance with the present invention of particular utility in implementing a low cost, light weight laser based distance measurement and ranging instrument as depicted in FIG. 1.

With reference additionally now to FIG. 2, a high efficiency voltage conversion circuit 50 in accordance with one embodiment of the present invention is shown. The circuit 50 comprises, in pertinent part, a linear timer integrated circuit ("IC") 52 having a $V_{DD}$ input thereof connected to a first voltage rail 54 and a ground ("GND") input thereof coupled to a second voltage rail 56. The integrated circuit 52 may be conveniently furnished as a model TLC555 linear CMOS timer device available from Texas Instruments, Inc. As will be more fully described hereinafter, a bipolar transistor 58 and series connected power MOSFET 60 also form a portion of the circuit 50.

The high efficiency voltage conversion circuit 50 includes an input 62 thereof which is coupled to the first voltage rail 54 through a resistor 64. One or more parallel connected capacitors 66, 68 couple the first voltage rail 54 to the second voltage rail 56, as shown. In a preferred embodiment, a voltage source of approximately 5.3 volts might be applied to input 62 to the low pass filter network comprising a 22 ohm resistor 64 in conjunction with capacitors 66, 68 having values of 47 uf and 0.1 uf, respectively.

Series connected resistors 70 and 72 couple the first voltage rail 54 to the second voltage rail 56 through a series connected capacitor 74. The discharge input ("DIS") of integrated circuit 52 is coupled to the node defined between the series connected resistors 70, 72 while the trigger ("TRG") and threshold ("THR") inputs of the integrated circuit 52 are coupled to the node defined between resistor 72 and capacitor 74 as shown. A reset ("RES") input 76 from additional circuitry (not shown) is provided to integrated circuit 52 while a control voltage ("VC") input 78 is also provided from other additional circuitry (not shown). In a preferred embodiment, resistor 70 may have a value of 47K ohms, resistor 72 may have a value of 15K ohms, while capacitor 74 has a value of 1nf.

The output of integrated circuit 52 ("OUT") at node 80 is supplied through resistor 82 to the base terminal of bipolar transistor 58 herein further identified as node 84. The output of integrated circuit 52 on node 80 is also supplied directly to the gate terminal of MOSFET 60. Node 84 at the base terminal of bipolar transistor 58 is coupled to the second voltage rail 56 by means of the series connected diode network 86 as shown. The collector terminal of bipolar transistor 58 is coupled to the first voltage rail 54 through an inductor 90 as shown. The emitter terminal of bipolar transistor 58 is connected to one terminal of MOSFET transistor 60 having its other terminal thereof coupled to the second voltage rail 56. In a preferred embodiment, resistor 82 may have a value of 2K ohms and inductor 90 may have a value of 1.5 mh. Bipolar transistor 58 may be conveniently furnished as a FMMT497 device while MOSFET transistor 60 may comprise a 2N7002 device. The diode network 86 may be conveniently furnished as a MMBD7000 device.

An additional diode network 88 couples the collector terminal of bipolar transistor 58 to the second voltage rail, as shown, and may be conveniently furnished as a MMBD1403 device. A further diode network 92 couples the collector terminal of bipolar transistor 58 through a resistor 96 to a voltage output 98, as shown. A capacitor 94 couples the node between the diode network 92 and resistor 96 to the second voltage rail. The diode network 92 may be conveniently furnished as a MMBD1403 device while resistor 96 may be 10K ohms and capacitor 94 may be 10nf.

The output 80 of the timer IC 52 controls the conduction and non-conduction of the transistor 58 and MOSFET 60 by providing a pulsed signal to the base of transistor 58 and MOSFET transistor 60.

In operation, when the output signal on the node 80 is low, the gate terminal of the MOSFET transistor 60 is also low thereby turning the device "off". In this state, no current is conducted through the bipolar transistor 58. When a positive voltage next appears on the node 80, base current on node 84 is provided to the bipolar transistor 58 through the resistor 82 and, at the same time, the MOSFET 60 is turned "on". In this "on" condition, the MOSFET 60 appears as the equivalent of a three ohm resistor in the emitter circuit of the bipolar transistor 58, and the drive current is effectively applied to the base terminal, without losses since the voltage at node 84 with respect to rail 56 is less than the turn-on voltage of dual diode 86.

As a result, when the bipolar transistor 58 is "on" and goes into saturation, the combination of the bipolar transistor 58 and the MOSFET 60 provides effectively a low loss switch and current efficiently builds up in the inductor 90 because of the conduction path to rail 56 formed through transistor 58 and MOSFET 60.

When the output signal on node 80 again goes "low", the base drive current on node 84 drops to zero and the MOSFET 60 is also switched "off" to provide what is essentially an open emitter circuit, effectively disconnecting inductor 90 from the established conduction path to rail 56. The MOSFET 60 turns "off" much faster than the saturated bipolar transistor 58. Therefore the current in the inductor 90 now flows out of the base of transistor 58, through dual diode 86 to rail 56. This base current is in the reverse direction compared with the forward bias current through resistor 82 during the "on" period and serves to deplete the stored base charge of transistor 58. Since this reverse current is large compared with the forward bias current, the transistor 58 is turned off very rapidly, with minimum energy losses.

Once the base charge is depleted, the bipolar transistor 58 snaps "off" and the collector terminal is free to fly up with the characteristic low base capacitance inherent in bipolar devices which is at least in order of magnitude less than that of the MOSFET 60. It should be recognized that without the MOSFET 60, the inherent capacitance of the bipolar transistor 58 would tend to turn it back "on". However, since the MOSFET 60 is now off, the emitter terminal of the bipolar transistor 58 is an effectively open circuit and the current has nowhere to go. In the particular embodiment shown, it has been noted that the emitter flies up to about 9 volts attempting to turn "on" although it is precluded from doing so as previously described. In a conventional switching circuit wherein only a single bipolar transistor might be used, (i.e. without MOSFET 60 or the diode network 86) transitioning the signal on node 80 to a "low" voltage level would result in a switching time that is effectively so slow it would deplete all the energy that has built up in the inductor 90. Consequently, little to no high voltage would appear at the output and the circuit would be extremely inefficient. Conversely, the use of a single MOS device, (i.e. without the bipolar transistor 58 or the diode network 86) would result in having to overcome such an inherently high drain-to-gate capacitance that significantly more energy must be stored in the inductor 90 for the circuit to function, resulting in an unacceptably low net efficiency.

With transistor 58 and MOSFET 60 "off", the energy stored in the inductor is transferred to capacitor 94 and to any load present at node 98, as diodes 92 direct the current from inductor 90 thereto. Diodes 88 increase the overall conversion efficiency by recovering some of the residual energy stored in inductor 90 when the voltage at node 93 falls back to a low value, prior to the next "on" period.

The voltage developed at the load is significantly stepped up from the input voltage at node 62 due to the current and voltage characteristics of the inductor 90 as affected by the switching characteristics provided by transistor 58 and MOSFET 60. When inductor 90 is released from rail 56 as described above, the voltage across inductor 90 tends to approach a very large value since a discontinuity has been introduced in the current through the inductor. Hence, a very large voltage appears at the anode of diode 92 which forward biases the diode so that the current stored in the inductor can flow to the load at node 98 and into capacitor 94. As this process is repeated under the control of timer IC 52, the average value of the output voltage at node 98 will be between 150 and 350 volts.

Functionally, the combination of bipolar transistor 58 and series connected MOSFET transistor 60 operate as a hybrid transistor exhibiting extremely low collector capacitance, with very high base drive efficiency, extremely fast switch-off times at low cost and with very little power lost to the capacitance of the node. The high voltage conversion circuit of the present invention provides approximately twice the efficiency (on the order of 70%) of any other available low cost voltage conversion circuit available for use in conjunction with portable, battery powered high voltage circuitry and is easily capable of converting a 3 to 5 volt input voltage (using, for example, two standard "AA" cells) to an output voltage of on the order of 150 to 350 volts, or the breakdown point of the bipolar transistor 58. The high voltage conversion circuit of the present invention may be advantageously provided using extremely low cost components and is extremely energy efficient.

While there have been described above the principles of the present invention in conjunction with specific circuitry and laser based distance measurement and ranging instrument applications, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A voltage conversion circuit for transforming an input voltage level at an input voltage node to a relatively higher output voltage level at an output voltage node with respect to a common reference voltage node, said circuit comprising:

an inductance coupling said input voltage node to said output voltage node;

a signal source supplying an output signal having alternating first and second states thereof;

a bipolar switch having first and second current carrying terminals and a control terminal thereof, said first current carrying terminal being coupled to said output voltage node and said control terminal being electrically isolated from said output voltage node and coupled to receive said output signal from said signal source;

a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said output signal from said signal source; and at least one first diode coupling said control terminal of said bipolar switch to said common reference voltage node.

2. The voltage conversion circuit of claim 1 further comprising first and second series connected resistors coupling said input voltage node to said common reference voltage node through a series connected capacitor.

3. The voltage conversion circuit of claim 1 wherein said input voltage level is at least as great as that suppliable by two standard "AA" battery cells.

4. The voltage conversion circuit of claim 1 wherein said MOS switch comprises an n-channel MOSFET.

5. The voltage conversion circuit of claim 1 wherein said control terminal of said bipolar switch is coupled to receive said output signal of said signal source through a resistance.

6. The voltage conversion circuit of claim 1 further comprising at least one second diode coupling said first current carrying terminal of said bipolar switch to said common reference voltage node.

7. The voltage conversion circuit of claim 1 wherein said output voltage level has an average value in a range of 150–350 volts.

8. The voltage conversion circuit of claim 1 wherein said bipolar switch comprises an NPN transistor.

9. The voltage conversion circuit of claim 8 wherein said NPN transistor comprises an FMMT497 type device.

10. The voltage conversion circuit of claim 1 wherein said MOS switch comprises a power MOSFET.

11. The voltage conversion circuit of claim 10 wherein said power MOSFET comprises a 2N7002 type device.

12. The voltage conversion circuit of claim 1 further comprising at least one third diode coupled between said first current carrying terminal of said bipolar switch and said output voltage node.

13. The voltage conversion circuit of claim 12 wherein said at least one third diode is coupled to said output voltage node through a resistance.

14. The voltage conversion circuit of claim 13 further comprising a capacitance coupling said at least one third diode to said common reference voltage node.

15. A voltage conversion circuit for transforming an input voltage level at an input voltage node to a relatively higher output voltage level at an output voltage node with respect to a common reference voltage node, said circuit comprising:

an inductance coupling said input voltage node to said output voltage node;

a signal source supplying an output signal having alternating first and second states thereof;

a bipolar switch having first and second current carrying terminals and a control terminal thereof, said first current carrying terminal being coupled to said output voltage node and said control terminal being coupled to receive said output signal from said signal source;

a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said output signal from said signal source;

at least one first diode coupling said control terminal of said bipolar switch to said common reference voltage node; and a low pass filter coupling said input voltage node to said common reference voltage node.

16. The voltage conversion circuit of claim 15 wherein said low pass filter comprises an RC network.

17. A voltage conversion circuit for transforming an input voltage level at an input voltage node to a relatively higher output voltage level at an output voltage node with respect to a common reference voltage node, said circuit comprising:

an inductance coupling said input voltage node to said output voltage node;

a signal source supplying an output signal having alternating first and second states thereof said signal source comprising a linear timer circuit;

a bipolar switch having first and second current carrying terminals and a control terminal thereof, said first current carrying terminal being coupled to said output voltage node and said control terminal being coupled to receive said output signal from said signal source;

a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said output signal from said signal source; and at least one first diode coupling said control terminal of said bipolar switch to said common reference voltage node.

18. The voltage conversion circuit of claim 17 wherein said linear timer circuit comprises a TLC555 device.

19. The voltage conversion circuit of claim 17 wherein said linear timer circuit further comprises discharge, trigger and threshold inputs thereto.

20. The voltage conversion circuit of claim 19 wherein said linear timer circuit further comprises reset and control voltage terminals thereof.

21. The voltage conversion circuit of claim 19 further comprising first and second series connected resistors for coupling said input voltage node to said common reference voltage node through a series connected capacitor.

22. The voltage conversion circuit of claim 21 wherein said discharge terminal is coupled to receive said input voltage level at a point between said first and second series connected resistors and said trigger and threshold terminals are coupled to said common reference voltage node through said series connected capacitor.

23. A voltage conversion circuit for transforming an input voltage level at an input voltage node to a relatively higher output voltage level at an output voltage node with respect to a common reference voltage node, said circuit comprising:

an inductance coupling said input voltage node to said output voltage node, said input voltage level being in a range of approximately 3–5 volts;

a signal source supplying an output signal having alternating first and second states thereof;

a bipolar switch having first and second current carrying terminals and a control terminal thereof, said first current carrying terminal being coupled to said output voltage node and said control terminal being coupled to receive said output signal from said signal source;

a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said output signal from said signal source; and at least one first diode coupling said control terminal of said bipolar switch to said common reference voltage node.

24. A voltage conversion circuit for transforming an input voltage level at an input voltage node to a relatively higher output voltage level at an output voltage node with respect to a common reference voltage node, said circuit comprising:

an inductance coupling said input voltage node to said output voltage node, said output voltage level being in a range of approximately 150–350 volts;

a signal source supplying an output signal having alternating first and second states thereof;

a bipolar switch having first and second current carrying terminals and a control terminal thereof, said first current carrying terminal being coupled to said output voltage node and said control terminal being coupled to receive said output signal from said signal source;

a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said output signal from said signal source; and at least one first diode coupling said control terminal of said bipolar switch to said common reference voltage node.

25. A voltage conversion circuit for transforming an input voltage level to a relatively higher output voltage level with respect to a common reference voltage level on a common reference voltage node, said circuit comprising:

a timer circuit having first and second voltage terminals thereof for receiving as inputs said input voltage level and said common reference voltage level respectively, said timer circuit providing an alternating state output signal therefrom;

a bipolar switch having first and second current carrying terminals and a control terminal thereof, said first current carrying terminal being inductively coupled to receive said input voltage level and said control terminal being electrically isolated from said inductive coupling and unidirectionally coupled to said common reference voltage node and to receive said alternating state output signal from said timer circuit, said alternating state output signal being capable of driving said bipolar switch to saturation; and a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said alternating state output signal from said timer circuit, said output voltage level being provided between said first current carrying terminal of said bipolar switch and said common reference voltage node.

26. The voltage conversion circuit of claim 25 wherein said output voltage level has an average value in a range of 150–350 volts.

27. The voltage conversion circuit of claim 25 wherein said control terminal of said bipolar switch is coupled to receive said alternating state output signal of said timer circuit through a resistance.

28. The voltage conversion circuit of claim 25 further comprising at least one diode coupling said first current carrying terminal of said bipolar switch to an output voltage node.

29. The voltage conversion circuit of claim 25 further comprising an input voltage node for providing said input voltage level to said timer circuit.

30. The voltage conversion circuit of claim 25 wherein said MOS switch comprises an n-channel MOSFET.

31. The voltage conversion circuit of claim 25 wherein said input voltage level is at least as great as that suppliable by two standard "AA" battery cells.

32. The voltage conversion circuit of claim 25 wherein said MOS switch comprises a power MOSFET.

33. The voltage conversion circuit of claim 32 wherein said power MOSFET comprises a 2N7002 or similar device.

34. The voltage conversion circuit of claim 25 further comprising at least one diode coupling said first current carrying terminal of said bipolar switch to an output voltage node.

35. The voltage conversion circuit of claim 34 wherein said at least one diode is coupled to said output voltage node through a resistance.

36. The voltage conversion circuit of claim 35 further comprising a capacitance coupling said at least one diode to said common reference voltage node.

37. A voltage conversion circuit for transforming an input voltage level to a relatively higher output voltage level with respect to a common reference voltage level on a common reference voltage node, said circuit comprising:
  a timer circuit having first and second voltage terminals thereof for receiving as inputs said input voltage level and said common reference voltage level respectively, said timer circuit providing an alternating state output signal therefrom;
  a bipolar switch having first and second current carrying terminals and a control terminal thereof, said first current carrying terminal being inductively coupled to receive said input voltage level and said control terminal being unidirectionally coupled to said common reference voltage node and to receive said alternating state output signal from said timer circuit
  a MOS switch having first and second voltage carrying terminals and a gate terminal thereof said first voltage carrying terminal being coupled to said common reference voltage node, said second voltage carrying terminal being coupled to said second current carrying terminal of said bipolar switch and said gate terminal being coupled to receive said alternating state output signal from said timer circuit, said output voltage level being provided between said first current carrying terminal of said bipolar switch and said common reference voltage node;
  an input voltage node for providing said input voltage level to said timer circuit; and
  a low pass filter coupling said input voltage node to said timer circuit.

38. The voltage conversion circuit of claim 37 wherein said low pass filter comprises an RC network.

39. A voltage conversion circuit for transforming an input voltage level to a relatively higher output voltage level with respect to a common reference voltage level on a common reference voltage node, said circuit comprising:
  a timer circuit having first and second voltage terminals thereof for receiving as inputs said input voltage level and said common reference voltage level respectively, said timer circuit providing an alternating state output signal therefrom, said timer circuit further comprising discharge, trigger and threshold inputs thereto;
  a bipolar switch having first and second current carrying terminals and a control terminal thereof, said first current carrying terminal being inductively coupled to receive said input voltage level and said control terminal being unidirectionally coupled to said common reference voltage node and to receive said alternating state output signal from said timer circuit; and
  a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said alternating state output signal from said timer circuit, said output voltage level being provided between said first current carrying terminal of said bipolar switch and said common reference voltage node.

40. The voltage conversion circuit of claim 39 wherein said timer circuit further comprises reset and control voltage terminals thereof.

41. The voltage conversion circuit of claim 39 further comprising first and second series connected resistors for coupling said input voltage level to said common reference voltage node through a series connected capacitor.

42. The voltage conversion circuit of claim 41 wherein said discharge terminal is coupled to receive said input voltage level at a point between said first and second series connected resistors and said trigger and threshold terminals are coupled to said common reference voltage node through said series connected capacitor.

43. The voltage conversion circuit of claim 39 wherein said timer circuit comprises a linear timer integrated circuit.

44. The voltage conversion circuit of claim 43 wherein said integrated circuit comprises a TLC555 type device.

45. The voltage conversion circuit of claim 43 wherein said bipolar switch comprises an NPN transistor.

46. The voltage conversion circuit of claim 45 wherein said NPN transistor comprises an FMMT497 type device.

47. A voltage conversion circuit for transforming an input voltage level to a relatively higher output voltage level with respect to a common reference voltage level on a common reference voltage node, said circuit comprising:
  a timer circuit having first and second voltage terminals thereof for receiving as inputs said input voltage level and said common reference voltage level respectively, said timer circuit providing an alternating state output signal therefrom, said input voltage level being in a range of approximately 3–5 volts;

a bipolar switch having first and second current carrying terminals and a control terminal thereof, said first current carrying terminal being inductively coupled to receive said input voltage level and said control terminal being unidirectionally coupled to said common reference voltage node and to receive said alternating state output signal from said timer circuit; and a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said alternating state output signal from said timer circuit, said output voltage level being provided between said first current carrying terminal of said bipolar switch and said common reference voltage node.

48. A voltage conversion circuit for transforming an input voltage level to a relatively higher output voltage level with respect to a common reference voltage level on a common reference voltage node, said circuit comprising:

a timer circuit having first and second voltage terminals thereof for receiving as inputs said input voltage level and said common reference voltage level respectively, said timer circuit providing an alternating state output signal therefrom;

a bipolar switch having first and second current carrying terminals and a control terminal thereof, said first current carrying terminal being inductively coupled to receive said input voltage level and said control terminal being unidirectionally coupled to said common reference voltage node and to receive said alternating state output signal from said timer circuit;

a MOS switch having first and second voltage carrying terminals and a gate terminal thereof, said first voltage carrying terminal being coupled to said common reference voltage node, said second voltage carrying terminal being coupled to said second current carrying terminal of said bipolar switch and said gate terminal being coupled to receive said alternating state output signal from said timer circuit, said output voltage level being provided between said first current carrying terminal of said bipolar switch and said common reference voltage node, said output voltage level being in a range of approximately 150–350 volts.

* * * * *